United States Patent [19]

Dent

[11] Patent Number: 4,923,319

[45] Date of Patent: May 8, 1990

[54] BREAKAWAY CONNECTOR

[76] Inventor: Clifford M. Dent, P.O. Box 1119, Kenai, Ak. 99611-1119

[21] Appl. No.: 370,402

[22] Filed: Jun. 22, 1989

[51] Int. Cl.⁵ .............................................. F16D 9/00
[52] U.S. Cl. .......................................... 403/2; 285/3; 411/389
[58] Field of Search ...................... 403/2; 52/98, 296; 285/3, 4; 411/2, 3, 4, 5, 389, 388

[56] References Cited

U.S. PATENT DOCUMENTS

| | | | |
|---|---|---|---|
| 3,499,630 | 3/1970 | Dashio | 256/13.1 |
| 3,521,413 | 7/1970 | Scott et al. | 52/98 |
| 4,720,204 | 1/1988 | Johnson | 285/2 X |

Primary Examiner—Andrew V. Kundrat
Attorney, Agent, or Firm—Cassidy, Vance and Tarleton

[57] ABSTRACT

A breakaway bolt (10) formed from a shaft (12) having a first end (14), a second end (16), and a breakaway shank (18). The breakaway segment is formed from laterally projecting and circumscribing flanges (22 and 24) that reduce in diameter to form cones (26 and 28) that intersect at a midpoint intersection (30) to create a preformed stress point that will break when the first end (14) or second end (16) is subjected to a predetermined lateral load. A breakaway spacer (32) formed in accordance with the present invention form a shaft (34) to have a first end (36) and a second end (38) that are connected by a breakaway shank (40). A first flange (44) and second flange (46) project laterally outward from and circumscribe the shaft (34) to form shoulders (48 and 50) and cones (52 and 54) that intersect at a midpoint intersection (56) to form a preformed stress point that allows the spacer (32) to break in any direction when subjected to a predetermined lateral load.

7 Claims, 2 Drawing Sheets

BREAKAWAY CONNECTOR

TECHNICAL FIELD

The present invention pertains to connectors and, more particularly, to a connector for securing a support member to an anchor member and that will break in any direction only at a preformed stress point when subjected to a predetermined lateral load.

BACKGROUND OF THE INVENTION

Existing highway signs, fences, lights, and guardrails frequently utilize a two-part support post. For instance, in the installation of road signs, a stub post is first placed in the ground with one end projecting four to eight inches above the ground. A flange is formed on or slipped over and attached to the projecting end of the stub post. The signpost has a corresponding flange that is then bolted to the stub post flange. If it becomes necessary to change the signpost, a new signpost can be quickly bolted to the stub post. When a signpost is subjected to a strong lateral load, e.g., the impact of a motor vehicle, the shear force will cause the bolts to fail, allowing the signpost to break from the stub post. One drawback of this type of installation is that the stub post and flange are frequently damaged or destroyed if the bolts are over-torqued when they are installed. This necessitates digging out and replacement of the stub post.

One proposed method for overcoming this drawback utilizes a concrete anchor placed into the ground and having bolt inserts cemented in place. Bolts that are designed to break when subjected to a predetermined amount of torque are placed through the signpost flange and threaded into the insert. This method has several disadvantages. First, because overtightening of the bolts will cause them to fail, installation must be accomplished by crews trained on proper torquing procedures. In addition, special torquing tools must be used to properly install the bolts. Furthermore, the bolt inserts tend to fill with water, dirt, adn other foreign matter, complicating the reinstallation of a damaged signpost. Finally, existing slip-based stub posts cannot be easily converted to this method because of the requirement that a concrete anchor be used.

SUMMARY OF THE INVENTION

The present invention is directed to a breakaway connector for attaching a support member to an anchor member. The connector comprises a first end adapted to be attached to a support member, such as a signpost, and a second end adapted to be attached to an anchor member, such as a slip-based stub post. The connector further comprises a shank positioned between and connected to said first end and said second end, said shank having a preformed stress point such that when said connector is subjected to a predetermined lateral load, the connector will break only at said preformed stress point.

In accordance with another aspect of the present invention, the shank has a predetermined outside diameter and the stress point comprises a portion of the shank having a reduced diameter. Preferably, the stress point comprises a V-shaped groove formed in the shank.

As will be readily appreciated from the foregoing description, the present invention provides a breakaway connector that will fracture at a desired fracture point in any direction when subjected to a predetermined lateral load. The connector is easily installed using standard tools. Present slip-based posts can be easily converted to the breakaway bolt or spacer.

BRIEF DESCRIPTION OF THE DRAWINGS

The foregoing and other features and advantages of the present invention will be more readily appreciated as the same becomes better understood with reference to the detailed description when taken in conjunction with the accompanying drawings, wherein.

DETAILED DESCRIPTION OF THE PREFERRED EMBODIMENT

Figure 1:
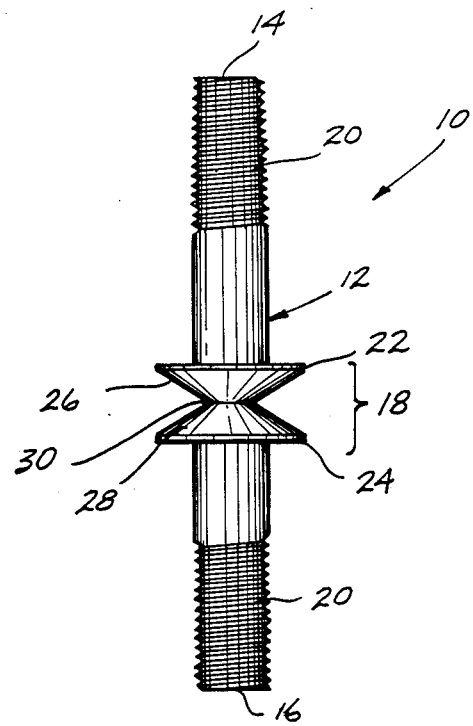
FIG. 1 is a side view of a breakaway bolt formed in accordance with the present invention.

Referring initially to FIG. 1, a breakaway bolt 10 is formed from a machined shaft 12 having a first end 14, a second end 16, and a breakaway shank 18 located between the first end 14 and the second end 16. The shaft may also be formed by a casting process, using either iron or brass material. Threads 20 are machined down the first and second ends 14 and 16 a suitable distance to accommodate various thicknesses of flange plates through which the bolt 10 will be inserted. Two flanges 22 and 24 are formed to project substantially perpendicularly outward from the shaft 12 to circumscribe the shaft 12 at the intersection with the breakaway shank 18. The breakaway shank 18 tapers gradually downward in diameter from the flanges 22 and 24 to form cones 26 and 28 that intersect at a midpoint 30 in the shank 18.

The flanges 22 and 24 provide bearing surfaces for plates, flanges, etc. to which the bolt 10 is fastened. The cones 26 and 28 provide circumscribing angled surfaces that permit bending and breaking of the bolt 10 in any direction. Breaking of the bolt 10 is designed to occur at a predetermined point. In this case, the sharp line formed by the intersection of the cones 26 and 28 at the midpoint 30 creates a preformed stress point that, combined with the narrowed diameter of the shaft at this point, facilitates breaking of the bolt at the midpoint 30 when subjected to a predetermined lateral load.

Figure 2:
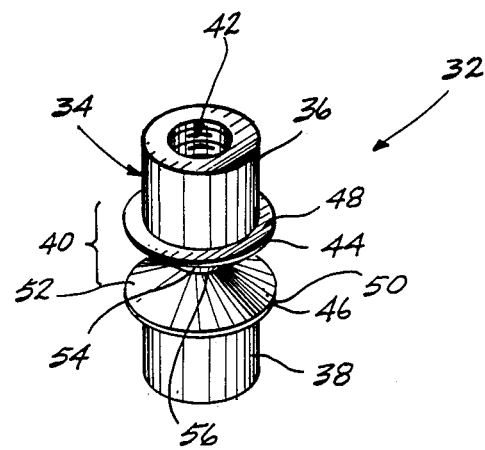
FIG. 2 is an isometric view of a breakaway spacer formed in accordance with the present invention.

The present invention may also be embodied in the configuration of a breakaway spacer 32 shown in FIG. 2. The spacer 32 is preferably machined from a shaft 34 to have a first end 36, a second end 38, and a breakaway shank 40 formed between the first end 36 and the second end 38. An internal axial bore 42 is formed in the first and second ends 36 and 38 and is threaded to receive a bolt or other similar fastener. The breakaway shank 40 is formed to have first and second flanges 44 and 46 projecting laterally outward form the circumscribing the shaft 34 to form shoulders 48 and 50. The diameter of the breakaway shank 40 decreases from a maximum diameter at the outside edges of the flanges 44 and 46 to form cone-shaped surfaces 52 and 54 that intersect at a midpoint intersection 56. The midpoint intersection 56 forms a stress point that, along with the narrowed diameter, facilitates breaking of the spacer 32 in any direction when subjected to a predetermined lateral load.

Both the breakaway bolt 10 and the breakaway spacer 32 may be constructed of cast iron, steel, aluminum, plastic, or other materials suitable for the desired application. Furthermore, the breakaway bolt 10 or spacer 23 can be galvanized to meet federal highway standards. The predetermined lateral load required to break the bolts can be calculated from the thickness of the midpoint intersection and the type of material used to construct the bolt 10 or spacer 32. Ideally, these connectors will be strong enough to resist breaking from the wind and normal maintenance while yielding to a strong lateral load, such as the load generated by the impact of a vehicle.

Figure 3:
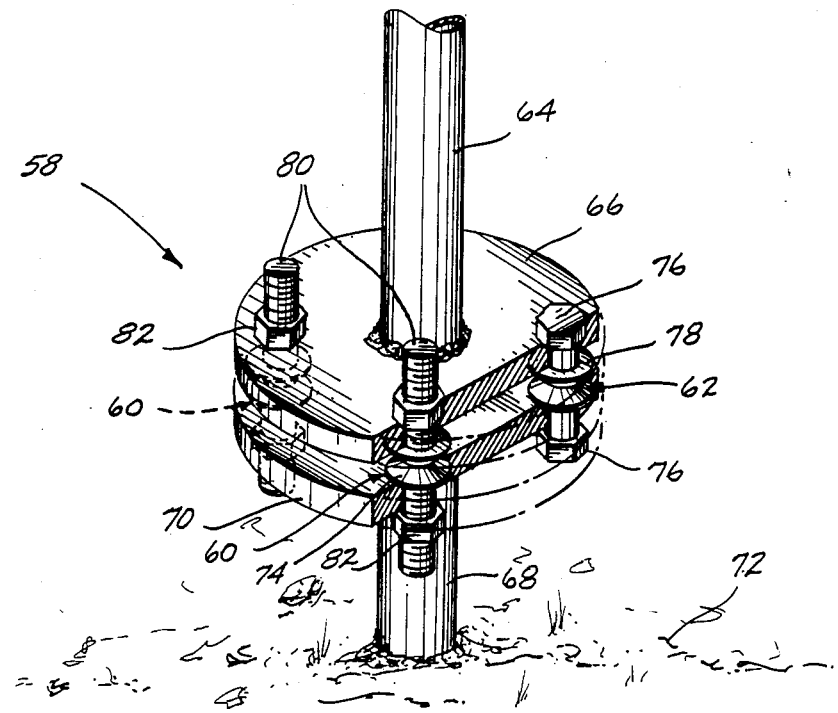
FIG. 3 is an isometric view of a breakaway bolt and a breakaway spacer installed on a post-and-stub assembly.

FIG. 3 illustrates one application of the present invention wherein both breakaway bolts 60 and breakaway spacers 62 are used on a post-and-stub connection 58. A pole 64 and pole stub 66, which can be part of a sign, fence, or other structure needed to be supported above the ground, are attached to a stub post 68 and stub flange 70. In a new installation, the stub post 68 is firmly placed in the ground 72 to project upward no more than two inches to provide a clearance for any low-profile vehicle that may run over it. When breakaway bolts are used, the bolts 60 are placed in openings in the stub flange 70 so that the bolt flanges 74 bear against the stub flange 70. When the spacers 62 are used, the spacer flanges 78 are placed on the stub flange 70 and firmly affixed thereto with bolt fasteners 76.

The pole flange 66 is then brought into position over the stub flange 70 and placed on the bolts 60 or the spacers 62. When the bolts 60 are used, the pole flange 66 has openings that allow the pole flange 66 to be placed over the threaded shaft 80 and rest on the bolt flanges 74. Nuts 82 are then threaded over the shafts 80 to hold the pole flange 66 in engagement with the stub flange 70. Alternativley, the spacers 62 could be used as a substitute for one or more of the bolts 60, in which case a bolt 76 would pass through the pole flange 66 and into the spacer 62 to hold the pole flange 66 to the spacer 62.

With the present invention, failure would occur only at the preformed stress points or midpoint intersections 56 of either the breakaway bolts 60 or the breakaway spacers 62 when the pole is subjected to a predetermined lateral load. Should this occur the stub pole 68 would remain in the ground 72 with the lower half of the bolt 60 or spacer 62 in place. Replacement or repair would simply be accomplished by removing and replacing the bolt 60 or spacer 62. As is evident from the foregoing description, the system requires no special tools or training by maintenance personnel. In addition, it enables existing slip-based posts to be upgraded very easily at a minimal cost.

It is to be understood that, while a preferred embodiment of the present invention has been illustrated and described, various changes can be made therein without departing from the spirit and scope of the invention. For instance, the breakaway bolts 10 may be threaded directly into bolt inserts held in the ground or in a cement anchor. In addition, the cone-shaped breakaway segment 18 may have other configurations. Consequently, the invention is to be liimited only by the scope of the claims which follow.

The embodiments of the invention in which an exclusive property or privilege is claimed are defined as follows:

1. A breakaway connector for attaching a support member to an anchor member, the connector comprising:
   a first end adapter to be attached to the support member;
   a second end adapter to be attached to the anchor member;
   a breakaway shank positioned between and connected to said first and second ends, said breakaway shank having a single performed stress point such that, when said connector is subjected to a predetermined lateral load, said connector will break only at said single performed stress point, said breakaway shank further including a circumscribing flange formed thereon at the intersection of said first end and said breakaway shank, and at the intersection of said second end and said breakaway shank.

2. The connector of claim 1, wherein said first and said second ends comprise threaded shafts.

3. The connector of claim 1, wherein said first and said second ends comprise internally threaded sleeves.

4. The connector of claim 1, wherein said breakaway shank comprises a shaft having a predetermined diameter and said single performed stress point comprises a portion of said shaft having a predetermined reduced diameter in the form of a V-shaped annular groove.

5. The connector of claim 1, wherein said flange has a predetermined maximum diameter on each side of said single performed stress point, said flange smoothly reducing in diameter from said predetermined maximum diameter to a predetermined reduced diameter to form a V-shaped annular groove at said single performed stress point.

6. The connector of claim 5, wherein said first and said second ends comprise threaded shafts.

7. The connector of claim 5, wherein said first and said second ends comprise internally threaded sleeves.

* * * * *